H. REUTCHLER & E. M. MORGAN.
Grain-Drill and Planter.
No. 164,482.
Patented June 15, 1875.
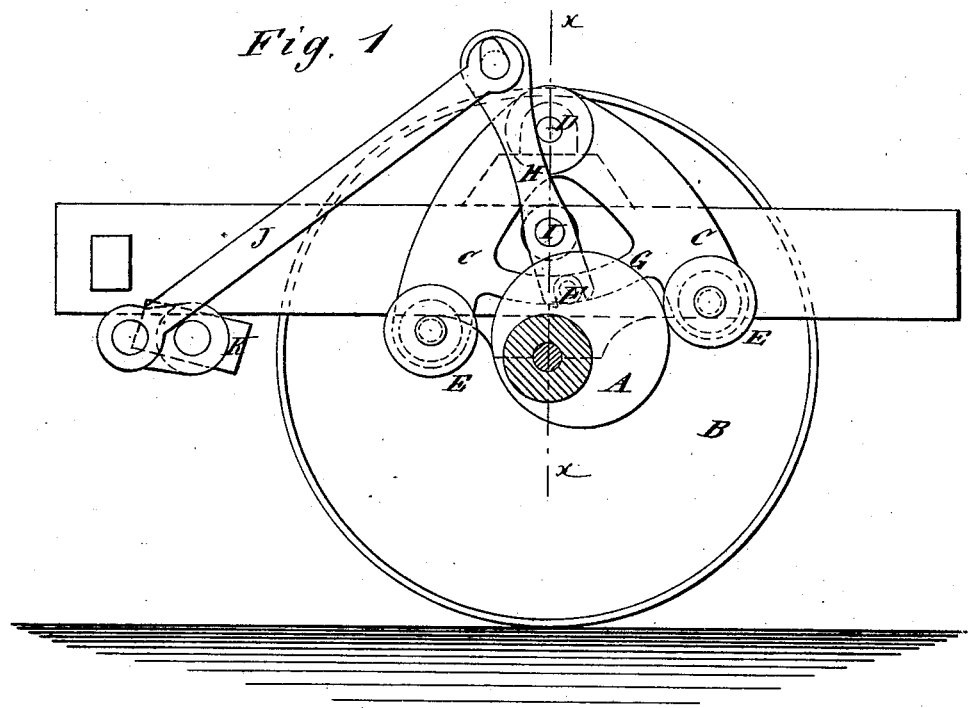
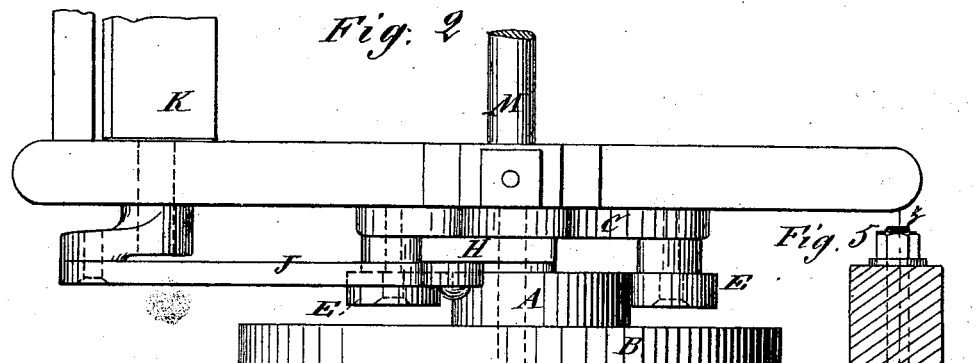
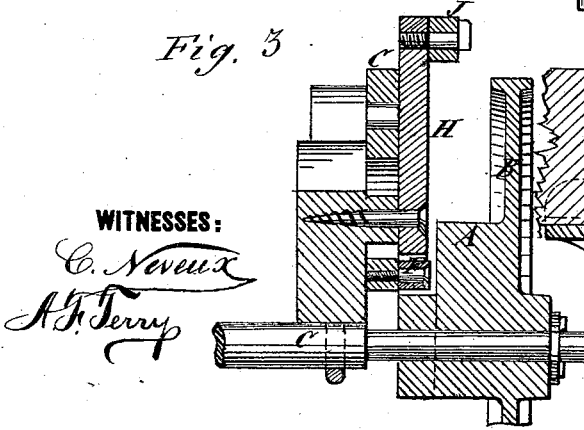
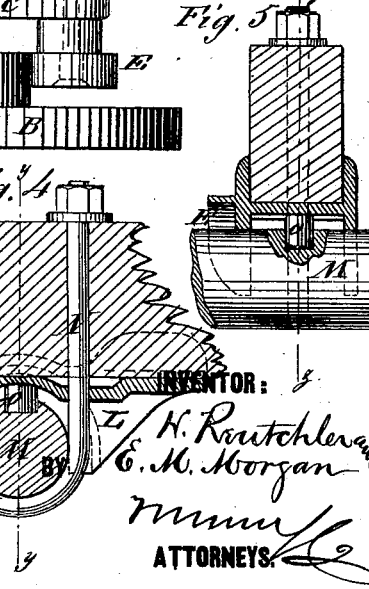
WITNESSES:
C. Neveux
A. F. Terry
INVENTOR:
H. Reutchler
E. M. Morgan
BY
ATTORNEYS.

UNITED STATES PATENT OFFICE.

HENRY REUTCHLER AND ELIAS M. MORGAN, OF BELLEVILLE, ILLINOIS.

IMPROVEMENT IN GRAIN-DRILLS AND PLANTERS.

Specification forming part of Letters Patent No. 164,482, dated June 15, 1875; application filed April 24, 1875.

*To all whom it may concern:*

Be it known that we, HENRY REUTCHLER and ELIAS M. MORGAN, of Belleville, in the county of St. Clair and State of Illinois, have invented new and useful Improvements in Grain-Drills, Planters, &c., of which the following is a specification:

Our invention relates to an improvement in cam movements for operating the grain-dropper of a drill or planter. We employ a pivoted yoke, straddling an eccentric on the axle of the truck, and imparting its own vibratory movement to a rock-lever, which reciprocates the grain-dropper through the medium of the ordinary connecting-rod. The invention also includes the construction and arrangement of certain devices for attaching the truck to the axle and preventing its rotation, all as hereinafter described and claimed.

Figure 1 is a longitudinal sectional elevation of the machine, showing our improved transmitting-gear in side elevation. Fig. 2 is a plan view. Fig. 3 is a section on line $x\ x$ of Fig. 1. Fig. 4 is a section on line $z\ z$ of Fig. 5, showing the contrivance for fastening the frame to the axle; and Fig. 5 is a section on line $y\ y$ of Fig. 4.

Similar letters of reference indicate corresponding parts.

A is the eccentric cam on one of the truck-wheels B, revolving between the arms C of a yoke, pivoted to the frame at D, to cause the yoke to swing forward and backward as a means for obtaining reciprocating motion. The yoke is provided with friction-rollers E, to run in contact with the cam and lessen the friction. The yoke has a stud-pin, F, on its bar G, working in a fork of a rock-lever, H, pivoted to the frame at I, and connected at the opposite end with the rod J, by which the motion is to be transmitted to the feeder or dropper K. The pivot I is a stud projecting from the frame through the opening in the yoke, and holding the rock-lever at the side of the yoke, so as to keep the yoke in place properly. The under side of the frame is fitted with boxes L to rest on the axle M, and the staples N are employed as a simple and cheap fastening to confine the axle in the boxes, requiring only one screw and nut. A stud, O, projects from the bottom of the box into a socket in the side of the axle to hold it from turning, the wheels being contrived to turn on the axle.

We do not claim, broadly, the construction or arrangement of a staple, as herein shown and described; but

Having thus described our invention, we claim as new and desire to secure by Letters Patent—

1. The A-shaped pivoted yoke C G, having friction-wheels E and stud-pin F, in combination with the eccentric mounted on the axle, the pivoted lever H, connecting-rod J, and grain-dropper K, all constructed and arranged to operate as specified.

2. The combination, with the axle having sockets or recesses, of the boxes L, having studs O and the staple N, constructed and arranged as shown and described.

HENRY REUTCHLER.
E. M. MORGAN.

Witnesses:
JOHN ORR,
J. D. REUTCHLER.